US012717643B2

(12) United States Patent
Wang et al.

(10) Patent No.: US 12,717,643 B2
(45) Date of Patent: Aug. 25, 2026

(54) DATA LOCALITY FOR BIG DATA ON KUBERNETES

(71) Applicant: INTERNATIONAL BUSINESS MACHINES CORPORATION, Armonk, NY (US)

(72) Inventors: Rui Wang, Beijing (CN); Jing Bo Jiang, Beijing (CN); Yi Ming Wang, Xi'An (CN); Yan Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 17/572,122

(22) Filed: Jan. 10, 2022

(65) Prior Publication Data

US 2023/0222004 A1 Jul. 13, 2023

(51) Int. Cl.
*G06F 9/50* (2006.01)
*G06N 7/01* (2023.01)

(52) U.S. Cl.
CPC .......... *G06F 9/5077* (2013.01); *G06F 9/5022* (2013.01); *G06F 9/5038* (2013.01); *G06F 9/5083* (2013.01); *G06N 7/01* (2023.01); *G06F 2209/508* (2013.01)

(58) Field of Classification Search
CPC .... G06F 9/5077; G06F 9/5022; G06F 9/5038; G06F 9/5083; G06F 2209/508; G06F 9/5005; G06F 9/5066; G06F 9/45558; G06F 9/4843; G06F 2009/4557; G06F 2009/45595; G06N 7/01
See application file for complete search history.

(56) References Cited

U.S. PATENT DOCUMENTS 12,118,395 B1 * 10/2024 Virtuoso ............... G06F 9/5072
2011/0173245 A1 7/2011 Castillo et al.
2016/0366224 A1 12/2016 Bonagiri et al.
(Continued)

FOREIGN PATENT DOCUMENTS

CN 110262896 A 9/2019
CN 116414518 A 7/2023
(Continued)

OTHER PUBLICATIONS

Hay, David, "Ensuring Application Data Locality in Kubernetes," 2019 Storage Developer Conference, LINBIT USA, Sep. 2019, 20 pages.

(Continued)

*Primary Examiner* — Sisley N Kim
(74) *Attorney, Agent, or Firm* — CHIP LAW GROUP

(57) ABSTRACT

Controlling data locality in a Kubernetes computing environment by establishing a Kubernetes computing environment including a controller and at least one executor pod for running an application, and receiving a request for a task to be run in the Kubernetes computing environment. The controller dispatches a sidecar to collect resource data from the at least one executor pod for an input to a directed acyclic graph (DAG) feature analyzer. The directed acyclic graph (DAG) feature analyzer identifies from the at least one executor pod a best dynamic resource that are available to execute. The at least one executor pod meeting the best dynamic resource that is available executes the task to be run in the Kubernetes computing.

20 Claims, 8 Drawing Sheets

(56) References Cited

U.S. PATENT DOCUMENTS

| | | | | |
|---|---|---|---|---|
| 2018/0101429 | A1* | 4/2018 | Melanchenko | G06F 11/0772 |
| 2021/0019194 | A1* | 1/2021 | Bahl | H04L 67/1031 |
| 2022/0060568 | A1* | 2/2022 | Tan | G06F 9/5066 |
| 2022/0124009 | A1* | 4/2022 | Metsch | G06N 20/00 |

FOREIGN PATENT DOCUMENTS

| | | | |
|---|---|---|---|
| JP | 2012-242973 | A | 12/2012 |
| JP | 2023-101462 | A | 7/2023 |
| WO | 2021/210123 | A1 | 10/2021 |

OTHER PUBLICATIONS

Mell, Peter, et al., "The NIST Definition of Cloud Computing," Sep. 2011, 7 pages.

Anonymous, "Spark uses Alluxio to ensure data locality in k8s," ProgrammerSought, https://www.programmersought.com/article/62107588975/, Aug. 2021, 10 pages.

Madan, Adit, et al., "Improving Data Locality for Analytics Jobs on Kubernets Using Alluxio," Alluxio, https:www.cncf.io/wp-content/uploads/2020/08/Alluxio-K8s-Locality-CNCF-Jan-2020, Jan. 2020, 45 pages.

Anonymous, "Hyperconverged Kubernetes," Robin, https://robin.io/wp-content/uploads/2018/08/hyper-converged-kubernets-white-paper, Apr. 2019, 15 pages.

Kim Kimoon. "HDFS on Kubernetes—Lessons Learned", retrieved from web https://www.youtube.com/watch?v=DxCDxi08HWo, Jun. 12, 2017, 2 pages.

Japan Patent Office, "Notice of Reasons for Refusal" Apr. 28, 2026, 07 Pages, JP Application No. 2022-204803.

* cited by examiner

| POD NAME | NODE | SHUFFLE DATA RANGE | MAX DATA VALUE | DATA SIZE | RESOURCE OBSERVABILITY CPU USAGE | RESOURCE OBSERVABILITY MEMORY USAGE | RESOURCE OBSERVABILITY STORAGE USAGE | SUGGEST TO ALLOCATE |
|---|---|---|---|---|---|---|---|---|
| EXECUTOR POD 1 | NODE 1 | | | | 30% | 90% | 10% | No |
| DATA VOLUME 1 | NODE 1 | 10 TO 30 | 30 | 10M | 30% | 90% | 10% | No |
| EXECUTOR POD 2 | NODE 2 | | | | 50% | 50% | 40% | Yes |
| DATA VOLUME 2 | NODE 2 | 50-10000 | 9999 | 500M | 50% | 50% | 40% | Yes |

FIG. 4

DATA LOCALITY FOR BIG DATA ON KUBERNETES

BACKGROUND

The present invention generally relates to managing distributed computing, and more particularly to Kubernetes.

Big data systems are large-scale applications that handle online and batch data with exponential growth. Kubernetes is an option available to deploy applications in large-scale infrastructures. Kubernetes is an example of a distributed system. Kubernetes treat all the machines in a cluster as a single pool of resources. Kubernetes take the role of a distributed operating system by effectively managing the scheduling, allocating the resources, monitoring the health of the infrastructure, and even maintaining the desired state of infrastructure and workloads. Kubernetes is an operating system capable of running modern applications across multiple clusters and infrastructures on cloud services and private data center environments. Kubernetes include two layers including of the head nodes and worker nodes. The head nodes typically run the control plane responsible for scheduling and managing the life cycle of workloads. The worker nodes act as the workhorses that run applications. The collection of head nodes and worker nodes becomes a cluster. The components of Kubernetes, can include a controller and scheduler. However, Kubernetes have some pain points when it comes to deploying big data stacks.

SUMMARY

In accordance with an embodiment of the present invention, a computer-implemented method is provided for controlling data locality in a Kubernetes computing environment. The computer-implemented method may include establishing a Kubernetes computing environment including a controller and at least one executor pod for running an application. The computer implemented method receives a request for a task to be run in the Kubernetes computing environment. The controller dispatches a sidecar to collect resource data from the at least one executor pod for an input to a directed acyclic graph (DAG) feature analyzer. The directed acyclic graph (DAG) feature analyzer identifies from the at least one executor pod a best dynamic resource that are available to execute. The at least one executor pod meeting the best dynamic resource that is available executes the task to be run in the Kubernetes computing environment.

In another embodiment, a system for controlling data locality in a Kubernetes computing environment is provided that includes a hardware processor; and a memory that stores a computer program product. The computer program product when executed by the hardware processor, causes the hardware processor to establish a Kubernetes computing environment including a controller and at least one executor pod for running an application. The system can further receive a request for a task to be run in the Kubernetes computing environment, and dispatch a sidecar to collect resource data from the at least one executor pod for an input to a directed acyclic graph (DAG) feature analyzer. The system can further provide that the directed acyclic graph (DAG) feature analyzer identifies from the at least one executor pod a best dynamic resource that are available to execute. The at least one executor pod meeting the best dynamic resource that is available executes the task to be run in the Kubernetes computing environment.

In yet another embodiment, a computer program product is provided for controlling data locality in Kubernetes. The computer program product may include a computer readable storage medium. The computer readable storage medium may have computer readable program code embodied therewith, the program instructions executable by a processor to cause the processor to a system establish a Kubernetes computing environment including a controller and at least one executor pod for running an application; and receive a request for a task to be run in the Kubernetes computing environment. In some embodiments, the computer program product further employs the hardware process to dispatch a sidecar to collect resource data from the at least one executor pod for an input to a directed acyclic graph (DAG) feature analyzer. The computer program product can further provide that the directed acyclic graph (DAG) feature analyzer identifies from the at least one executor pod a best dynamic resource that are available to execute. The at least one executor pod meeting the best dynamic resource that is available executes the task to be run in the Kubernetes computing environment.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 4 is a table illustrating one example of resource allocation recommendations produced by a direct acyclic graph diagram, in accordance with one embodiment of the present disclosure.

DETAILED DESCRIPTION

Figure 1:
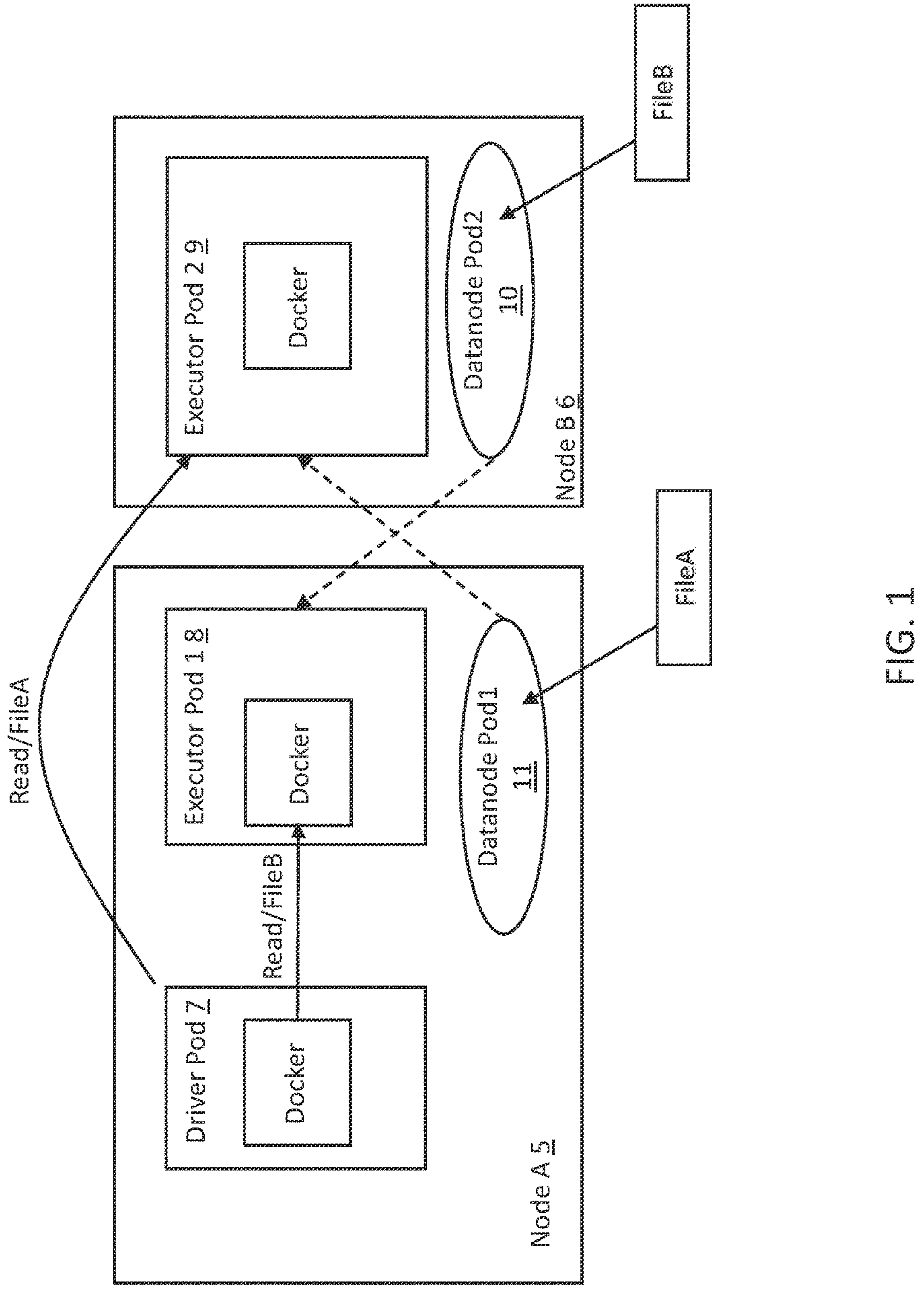
FIG. 1 is an illustration of an exemplary environment for employing Kubernetes, in accordance with one embodiment of the present disclosure.

The methods, systems and computer program products described herein are directed to implementing data locality for big data on Kubernetes. Kubernetes is an option to deploy applications in large-scale infrastructures. However, it has been determined that Kubernetes can have some pain points when it comes to deploying big data stacks. One particular difficulty is following data locality, as illustrated in FIG. 1. In FIG. 1, a Kubernetes example is provided having two nodes, i.e., node A 5 and node B 6. Kubernetes include two layers including of head nodes and worker nodes. The head nodes typically run the control plane responsible for scheduling and managing the life cycle of workloads. The worker nodes act as the workhorses that run applications. The collection of head nodes and worker nodes becomes a cluster.

In the example, depicted in FIG. 1, node A 5 is running a job that needs to read data stored in HDFS on a data node that is sitting on node B 6 in the cluster. HDFS is a distributed file system that handles large data sets running on commodity hardware.

On node A 5, there is a driver pod 7 that is trying to read file B on an executor pod 1 having reference number "8". The job "Docker" is running on the driver pod 7 and the executor pod 8 on the first node, i.e., node A 5. The job "Docker" is also running on executor pod 2 having reference number "9" on the second node, i.e., node B 6. The executor pod 1 on node A needs a datapoint from datanode pod 2 having reference number 10 on node b. The executor pod 2 on node B needs a datapoint from datanode pod 1 having reference number 11 on node A.

In the example depicted in FIG. 1, running the job on node A that needs to read data stored in the HDFS on a data node that is sitting on node B in the cluster greatly increases network latency, because the data is being sent over the network of the isolated system for compute purposes. It has been determined that Kubernetes prior to the methods, systems and computer program products of the present disclosure has issues with data locality.

The main reason of data locality issues in Kubernetes is the common general stateless resource management architecture. The statements resource management architecture of Kubernetes does not tell the big data application the address of the resources allocated to each container. When describing a distributed computing environment, such as a cloud environment, a "container" is a term referring to a unit of software whose packaging includes all the associated dependencies and is designed to run reliably in different computing environments. For example, a docker is a popular open source container platform and docker image is a standalone executable package that comprises application, runtime, system libraries and settings required to run the application. One or more containers get grouped into tightly coupled as logical hosts based on application process requirements referred to as "pods". A pod is a basic deployable object by orchestrator and it is repeatable by design. Pods can be independently brought up or down based on the resource requirements at any point in time through an orchestration environment in the cloud. Kubernetes is an example of an orchestration system for docker containers.

Figure 3:
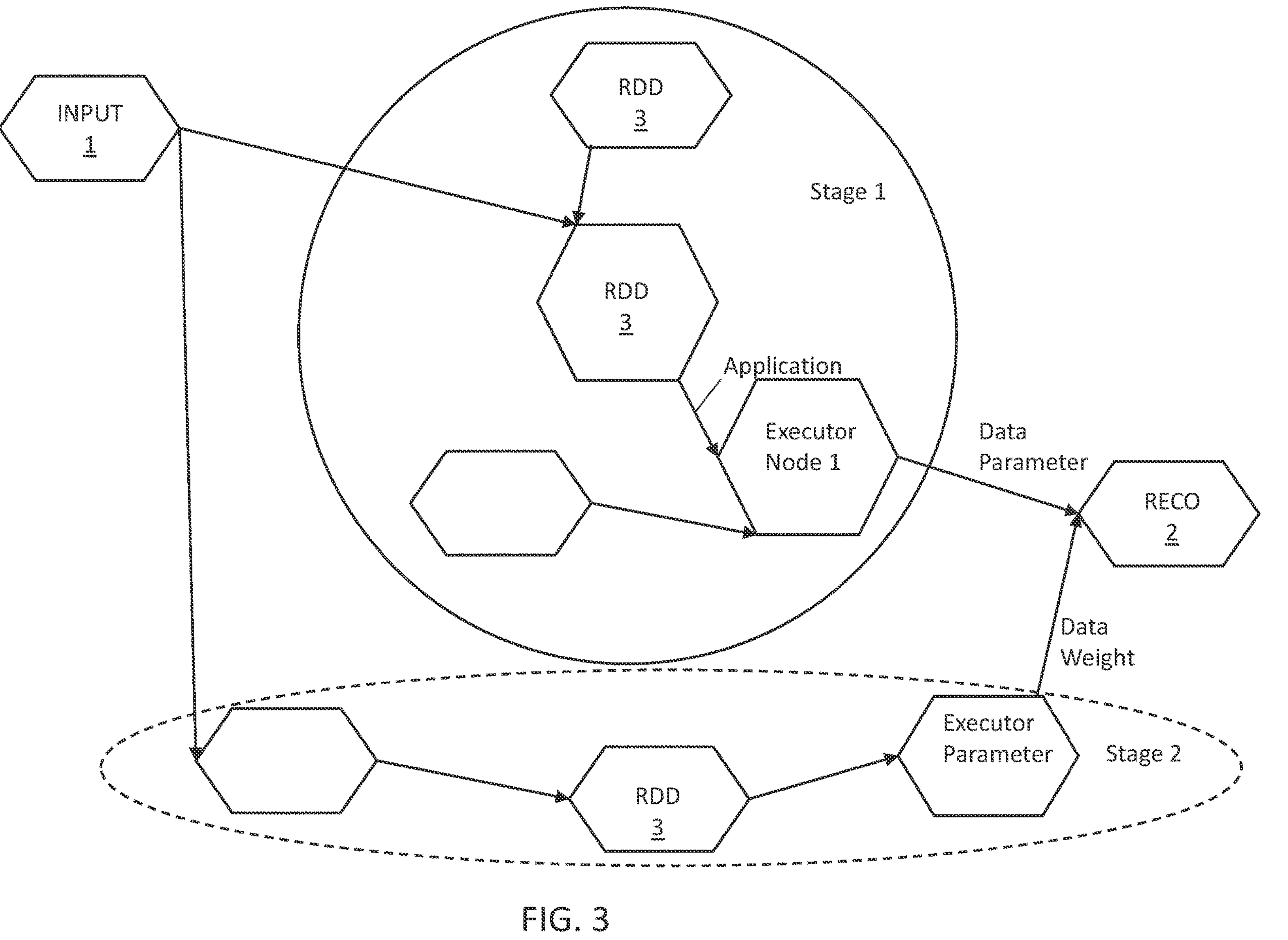
FIG. 3 illustrates one embodiment of a directed acyclic graph diagram.

The methods, systems and computer program products of the present disclosure address the problems of big data applications with data locality issues on Kubernetes with self discovery methods by parameter-based DAG-stage feature analysis to identify what are the best dynamic resources, which are available to execute. (Directed Acyclic Graph) DAG is a set of Vertices and Edges, where vertices represent the RDDs 3 and the edges represent the Operation 4 to be applied on RDD, as illustrated in FIG. 3. In DAG, every edge directs from earlier to later in the sequence. On the calling of Action, the created DAG submits to DAG Scheduler which further splits the graph into the stages of the task. Resilient Distributed Datasets (RDD) is a data structure that includes an immutable distributed collection of objects.

Based on the big data application partition distribution execution plan, the methods described herein generate a directed acyclic graph (DAG) diagram. In a following step, create a stage based on partition transformation and inter-dependency. Data persistence or shuffle happens during one stage, e.g., stage 1 of FIG. 3, and when complete the next stage is to be executed, e.g., stage 2 of FIG. 3. The last executor of stage sends its node information and partition output byte size to big data application scheduler. The scheduler based on parameter based DAG stage feature analysis method to analysis executor pod physical node and shuffle data weight in current stage and recommend (at block 2 of FIG. 3) what is the best executor pod node selector.

The methods, systems and computer program products described herein provide a self-discovery method to implement dynamic resource allocation on Kubernetes. Some advantages include automatically recommending dynamic resource allocation. Merging the decisions generated without human intervention. A system is provided to track parameter, such as data and node statistic information for executor pod resource recommendation. The methods, systems and computer program products consider Kubernetes/open shift observability to better check pod scalar factors to void resource limitations and pod deployment failure issues. The system is based on sidecar or proxy rather than code invasive.

The methods, systems and computer program products are now described in greater detail with reference to FIGS. 2-8.

Figure 2:
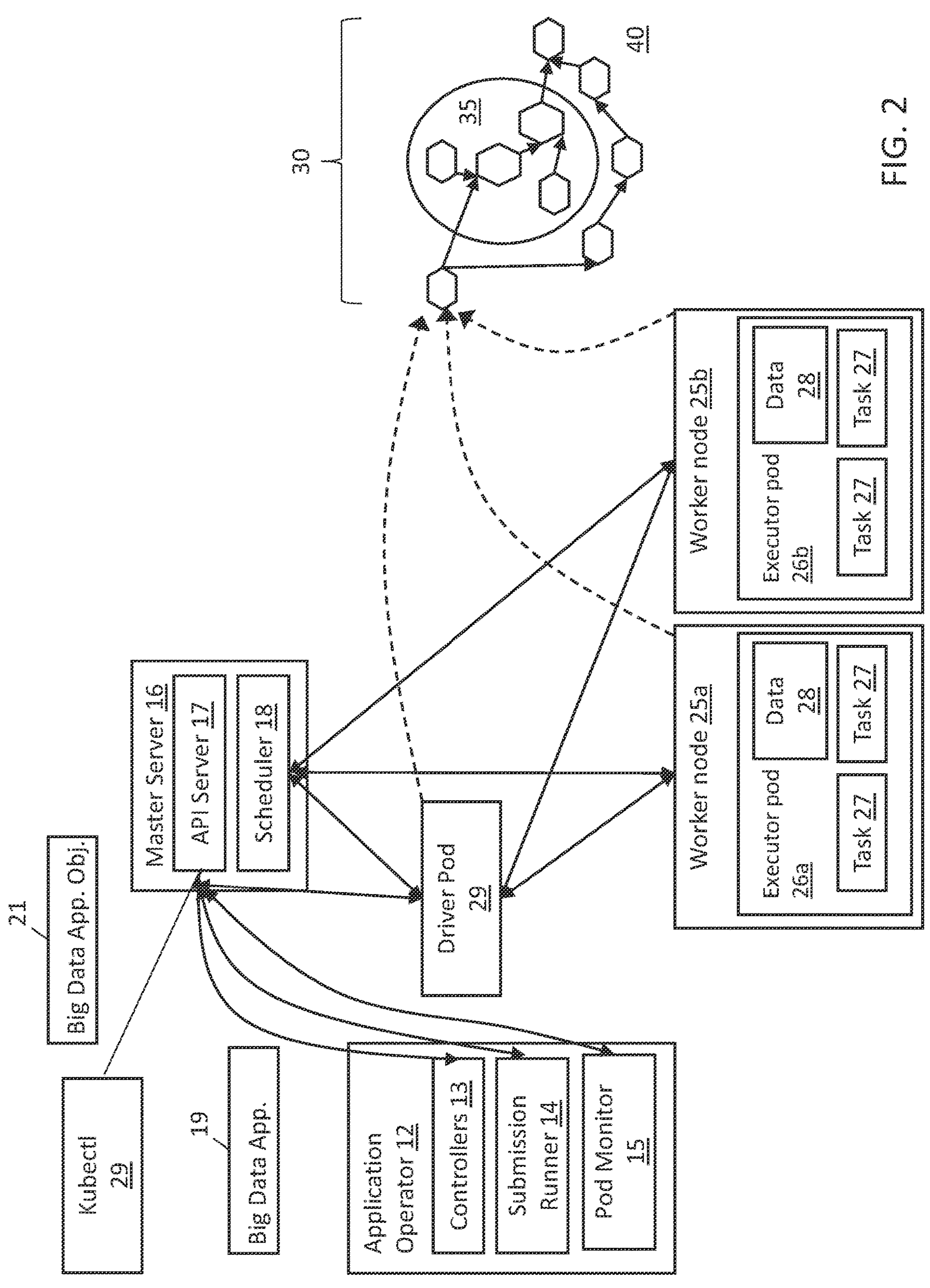
FIG. 2 is a flow chart/block diagram illustrating a system for implementing data locality for big data on Kubernetes, in accordance with one embodiment of the present disclosure.

FIG. 2 illustrates one embodiment of an exemplary environment for a system and method to implement data locality for big data on Kubernetes. FIG. 3 illustrates one embodiment of a directed acyclic graph diagram.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2 depicts one embodiment of an exemplary environment, including an application operator 12 that is in communication with a master server 16. The application operator 12 includes controllers 13, a submission runner 14, and a pod monitor 15. The master server 16 includes an application programming interface (API) server 17 and a scheduler 18. The big data application 19 is run between these elements, i.e., the application operator 12 and the master server 16. The pod monitor 15 monitors pod events for the Kubernetes, and is in communication with the API server 17. The submission runner 14 is also in communication with the API server 17.

A Kubectl 20 is also in communication with the API server 17 of the master server 16. Kubectl allows you to run commands against Kubernetes clusters. Kubectl 20 can be used deploy applications, inspect and manage cluster resources, and view logs. The big data application objective 21 can be transmitted between the Kubectl 20 and the API server 17 of the master server 16.

Still referring to FIG. 2, worker nodes are identified by reference numbers 25*a* and 25*b*. Each worker node 25*a*, 25*b* include a executor pod 26*a*, 26*b* that includes data 28 and tasks 27. The worker nodes 25*a*, 25*b* are in communication with the scheduler 17 of the master server 16.

Still referring to FIG. 2, a driver pod 29 is also in communication with the scheduler 17 of the master server 16. The driver pod 29 is also in communication with the worker nodes 28*a*, 28*b*.

The driver pods 29 and the worker nodes 25*a*, 25*b* are in communication with a directed acyclic graph (DAG) feature analyzer 30, which can identify what are the best dynamic resources, which are available to the executor. The driver pods 29 and worker nodes 25*a*, 25*b* are in communication with the DAG feature analyzer 30 through a sidecar 31.

The sidecar pattern helps achieving this principle by decoupling the main business logic from supplementary tasks that extend the original functionality. In Kubernetes, a M is a group of one or more containers with shared storage and network. A sidecar is a utility container in a pod that's loosely coupled to the main application container. The sidecar 31 may function as a data loader.

Figure 5:
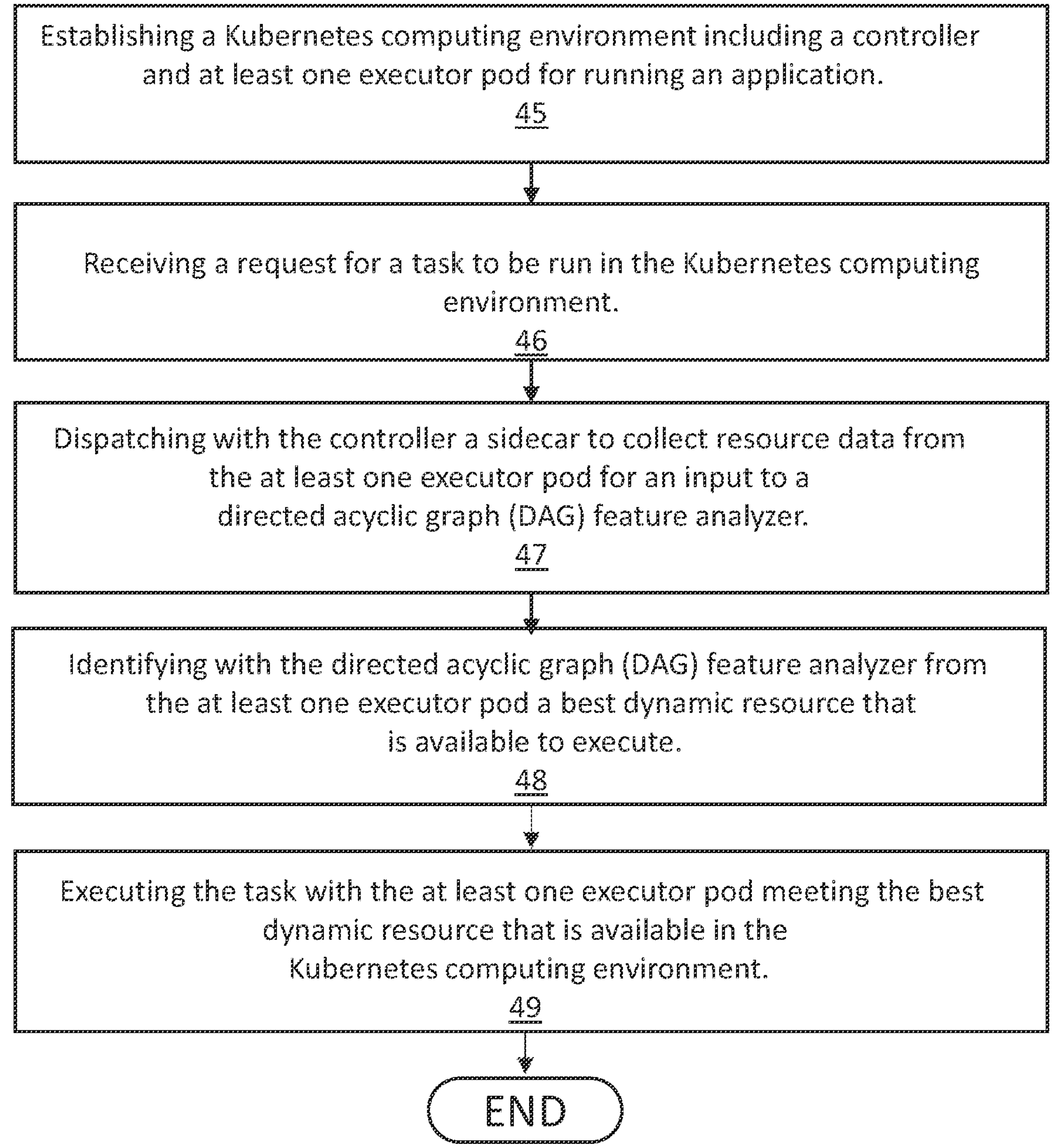
FIG. 5 is a flow chart/block diagram illustrating a method for implementing data locality for big data on Kubernetes, in accordance with one embodiment of the present disclosure.

FIG. 5 illustrates a method for implementing data locality for big data on Kubernetes, in accordance with one embodiment of the present disclosure. Block 45 of FIG. 5 includes establishing a Kubernetes computing environment including a controller 20 and at least one executor pod 26*a*. 26*b* for running an application, e.g., big data application. Block 45 may provide the computing environment depicted in FIG. 2.

Referring back to FIG. 2, in one example, the API server 17 may submit a request for a task to the application operator 12. The application operator 12 includes the controller 13, which includes an event listener from receiving the task request. In some embodiments, once the application operator 12 receives a creating task request, the application operator 12 can submit a task using the submission runner 12. The pod monitor 15 monitors pod status and events, and then notify by the controller for the Kubernetes, i.e., Kube controller 20, to dispatch the driver pod 29 and the executor pod 26*a*. 26*b*.

Referring to block 46 of FIG. 5, in some embodiments, the computer implemented method for providing locality in a Kubernetes computing environment handling bid data applications can include receiving a request for a task to be run in the Kubernetes computing environment. This step may be provided by the above described process flow beginning with the server 17 submitting a request for a task to the application operator 12, in which the application operator 12 can submit a task using the submission runner 14 to the master server 16.

Block 47 of FIG. 5 further includes dispatching with the controller, e.g., Kube controller 20 to scheduler 18 of master server 16, to collect resource data from at least one executor pod 26*a*, 26*b*, for an input 1 to the directed acyclic graph (DAG) feature analyzer 30. Resource and data volume information can also be collected from the driver pod 29.

Referring to FIG. 2, the sidecar is deployed in the driver pod 29 and the executor pod 26*a*, 26*b* to collect resource and data volume information. This information is collected by the driver pod 29 and the application operator 12. Based on the information collected, information is provided by the DAP feature analyzer 30 to send accurate instructions on where the next executor pod is allocated to reduce latency and provide optimized data locality.

Block 48 of the method illustrated by the block/flow diagram depicted in FIG. 5 includes identifying with the directed acyclic graph (DAG) feature analyzer from the at least one executor pod 26*a*, 26*b* a best dynamic resource that is available to execute the request, i.e., in the Kubernetes computing environment.

FIG. 3 illustrates one embodiment of a DAG-stage feature analyzer 35. In some embodiments, providing a DAG-stage feature analyzer 35 may begin with building data and stage network based on the big application code implementation and distribution execution plan. In one embodiment, big data is split to partition or RDD. RDDs refers to Resilient Distributed Datasets. They are a collection of various data items that are large enough in size so that they cannot fit into a single node. In view of the data size, it is divides it into partitions across various nodes referred to as resilient distributed datasets (RDDs).

In a following step, each operation or code function executes on a partition or RDD.

These operations compose together and big data application execution engine view these as a Directed Acyclic Graph (DAG), as depicted in FIG. 3. There are two types of RDD operation. For example, there is narrow operation RDD operation, and there is wide operation RDD operation. Narrow operation does not include shuffling of data across a partition. Narrow operation will group into single stage. Wide operation on the other had results in stage boundaries, e.g., a first stage and a second stage as depicted in FIG. 3.

In a following step, the method can identify and generation recommendations to dynamic allocation based Dag and Stage feature analysis and collected parameters. The steps can include based upon the executor pod and data volume statistics recommending next step executors resource allocation. This may be provided by stage 1 of the DAG depicted in FIG. 3. The data volume statistics considered may include node information, data output range, max value, and the size of the data.

Thereafter, the method may continue with capturing Kubernete resource observability to balance resource autoscaling relevance data to further next step executor resource. This may be provided by stage 2 of the DAG depicted in FIG. 3

One example of outputs from a DAG stage feature analysis method for resource allocation recommendations is depicted in the table illustrated in FIG. 4.

Using the resource allocation, the Kubernetes executor runs each task instance in its own pod on a Kubernetes cluster. When a DAG submits a task, the KubernetesExecutor requests a worker pod from the Kubernetes API. The worker pod then runs the task, reports the result, and terminates. Block 49 of the method depicted in FIG. 5 includes executing the task with the at least one executor pod 26*a*, 26*b* meeting the best dynamic resource that is available in the Kubernetes computing environment.

Figure 6:
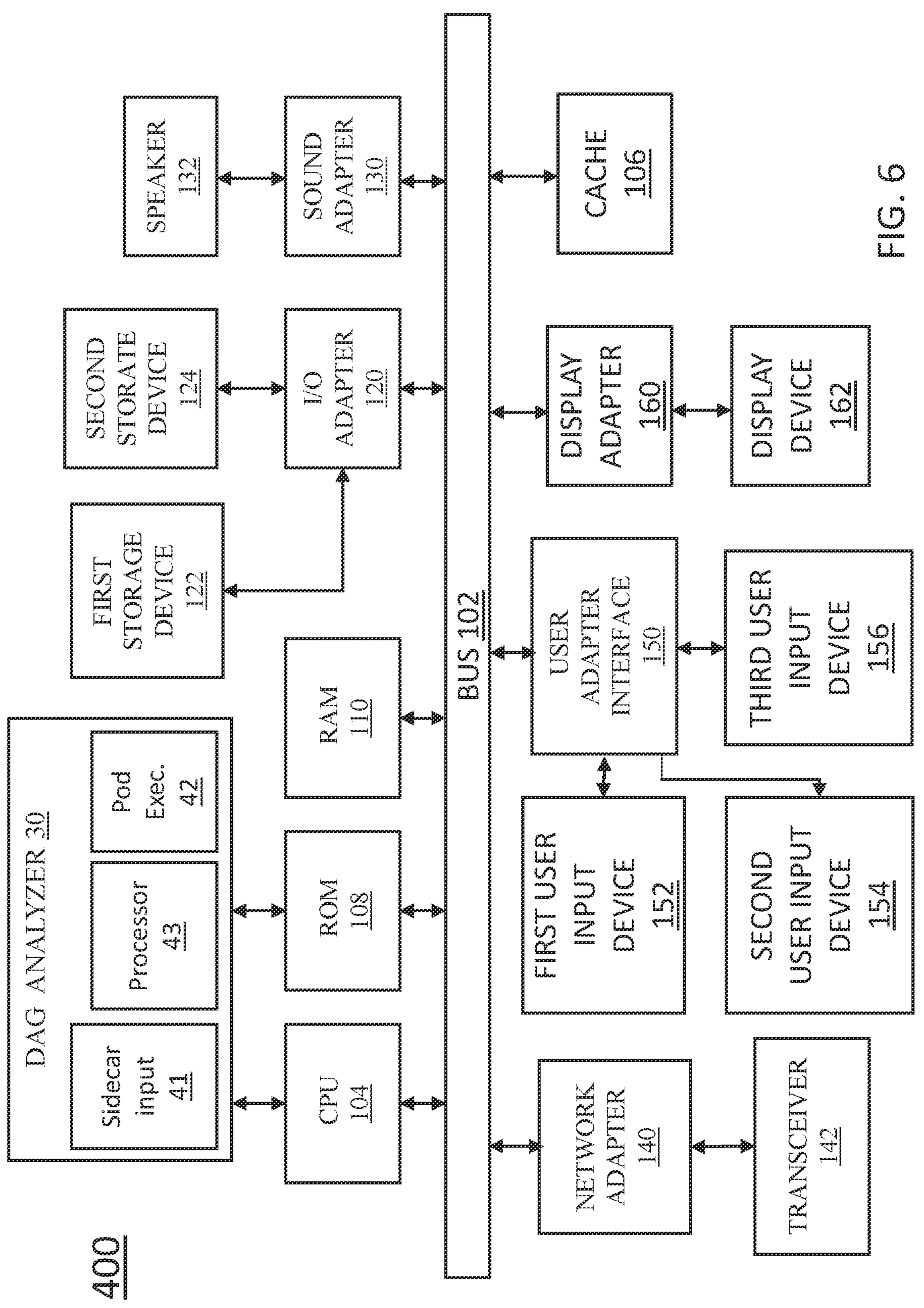
FIG. 6 is a block diagram illustrating a system that can incorporate the system for employing Kubernetes, that are depicted in FIG. 2, in accordance with one embodiment of the present disclosure.

FIG. 6 is a block diagram illustrating a DAG stage feature analyzer 30 as used to implement data locality for big data on Kubernetes. The system for implementing data locality for big data on is provided that includes a hardware processor 43; and a memory that stores a computer program product. The computer program product when executed by the hardware processor 43, causes the hardware processor to establish a Kubernetes computing environment including a controller and at least one executor pod for running an application. The system can further receive a request for a task to be run in the Kubernetes computing environment, and dispatch a sidecar to collect resource data from the at least one executor pod for an input to a directed acyclic graph (DAG) feature analyzer. The sidecar input is identified by reference number 41. The system can further provide that the directed acyclic graph (DAG) feature analyzer 30 identifies from the at least one executor pod a best dynamic resource that are available to execute. The at least one executor pod meeting the best dynamic resource that is available executes the task to be run in the Kubernetes computing environment. The DAG feature analyzer 30 includes a pod executor 42.

FIG. 6 further illustrates a processing system 400 that can in DAG stage feature analyzer 30. The exemplary processing system 400 to which the present invention may be applied is shown in accordance with one embodiment. The processing system 400 includes at least one processor (CPU) 104 operatively coupled to other components via a system bus 102. The system bus 102 may be in communication with the pod heath check system 200. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term “hardware processor subsystem” or “hardware processor” can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided foe controlling data locality in Kubernetes. The computer program product may include a computer readable storage medium. The computer readable storage medium may have computer readable program code embodied therewith, the program instructions executable by a processor to cause the processor to a system establish a Kubernetes computing environment including a controller and at least one executor pod for running an application; and receive a request for a task to be run in the Kubernetes computing environment. In some embodiments, the computer program product further employs the hardware process to dispatch a sidecar to collect resource data from the at least one executor pod for an input to a directed acyclic graph (DAG) feature analyzer. The computer program product can further provide that the directed acyclic graph (DAG) feature analyzer identifies from the at least one executor pod a best dynamic resource that are available to execute. The at least one executor pod meeting the best dynamic resource that is available executes the task to be run in the Kubernetes computing environment.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-Demand Self-Service: A Cloud Consumer can Unilaterally Provision Computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
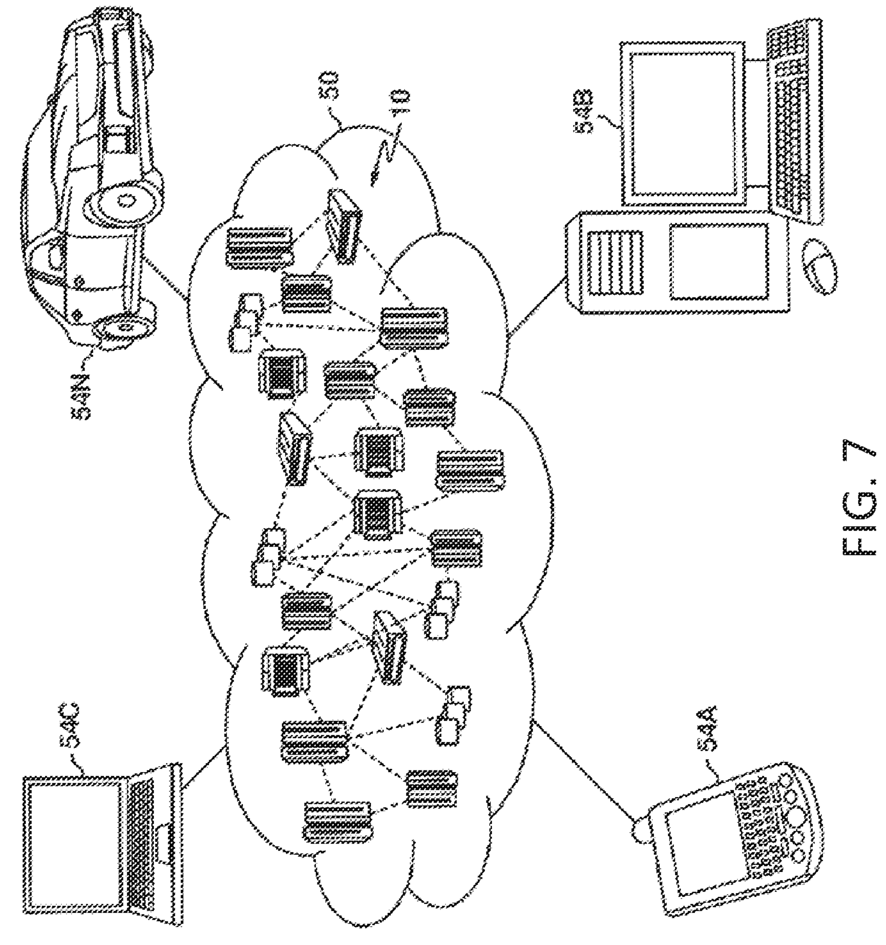
FIG. 7 depicts a cloud computing environment according to an embodiment of the present disclosure.

Referring now to FIG. 7, illustrative cloud computing environment is depicted. As shown, cloud computing environment includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
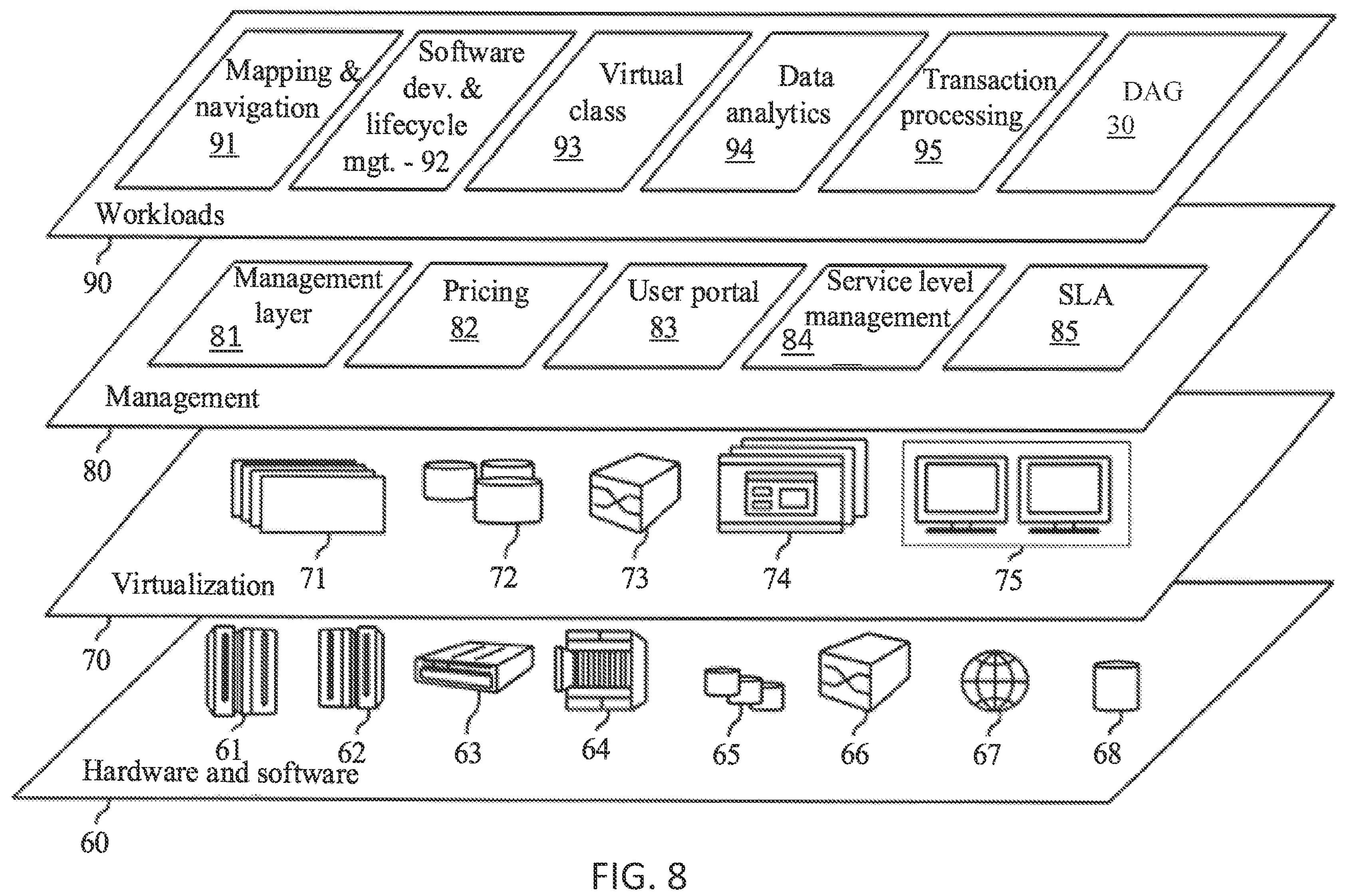
FIG. 8 depicts abstraction model layers according to an embodiment of the present disclosure.

Referring now to FIG. 8, a set of functional abstraction layers provided by cloud computing environment (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a DAG stage feature analyzer 30 for implementing data locality for bid data on Kubernetes, in accordance with FIGS. 1-7.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for implementing data locality for bid data on Kubernetes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method is provided for controlling data locality in a Kubernetes computing environment comprising:

establishing a Kubernetes computing environment including a controller and at least one executor pod for running an application;

receiving a request for a task to be run in the Kubernetes computing environment;

dispatching, with the controller, a sidecar to collect resource data from the at least one executor pod for an input to a directed acyclic graph (DAG) feature analyzer that communicates with the at least one executor pod within worker nodes and a driver pod through the sidecar;

identifying with the directed acyclic graph (DAG) feature analyzer from the at least one executor pod a best dynamic resource that is available to execute by generating a multi-level DAG based on collected resource data by the sidecar that includes a data persistence classification of operations executed by the application across partitions; and executing the task with the at least one executor pod meeting the best dynamic resource that is available in the Kubernetes computing environment.

2. The computer-implemented method of claim 1, wherein receiving the request for a task to be run comprises an application operator generating a task with a submission runner that sends the task to a master server that commissions a scheduler to communicate with a driver pod and worker nodes of the Kubernetes computing environment.

3. The computer-implemented method of claim 2, wherein dispatching the sidecar comprises collecting the resource data using the driver pod and the worker nodes.

4. The computer-implemented method of claim 1, wherein the resource data is selected from data volume statistics consisting of executor pod volume, data volume, node information, data output ranges, max value size, CPU usage, storage usage, and combinations thereof.

5. The computer-implemented method of claim 1, wherein executing the task comprises running the task, reporting a result and terminating.

6. The computer-implemented method of claim 1, wherein the directed acyclic graph (DAG) feature analyzer includes a graph having vertices representing resilient distributed datasets, and edges representing operations applied to the resilient distributed datasets.

7. The computer-implemented method of claim 6, wherein the directed acyclic graph (DAG) feature analyzer includes two stages, wherein a first stage recommends executor resource allocation based on the resource data from the at least one executor pod, and a second stage captures Kubernetes resource observability to balance resource autoscaling responsive to the executor resource allocation based on the resource data.

8. A system for controlling data locality in a Kubernetes computing environment comprising:

a hardware processor; and a memory that stores a computer program product, the computer program product when executed by the hardware processor, causes the hardware processor to:

establish a Kubernetes computing environment including a controller and at least one executor pod for running an application;

receive a request for a task to be run in the Kubernetes computing environment;

dispatch a sidecar to collect resource data from the at least one executor pod for an input to a directed acyclic graph (DAG) feature analyzer that communicates with the at least one executor pod within worker nodes and a driver pod through the sidecar;

provide that the directed acyclic graph (DAG) feature analyzer identifies from the at least one executor pod a best dynamic resource that are available to execute by generating a multi-level DAG based on collected resource data by the sidecar that includes a data persistence classification of operations executed by the application across partitions; and execute the task on at least one executor pod meeting the best dynamic resource that is available in the Kubernetes computing environment.

9. The system of claim 8, wherein receiving the request for a task to be run comprises an application operator generating a task with a submission runner that sends the task to a master server that commissions a scheduler to communicate with a driver pod and worker nodes of the Kubernetes computing environment.

10. The system of claim 9, wherein dispatching the sidecar comprises collecting the resource data using the driver pod and the worker nodes.

11. The system of claim 8, wherein the resource data is selected from data volume statistics consisting of executor pod volume, data volume, node information, data output ranges, max value size, CPU usage, storage usage, and combinations thereof.

12. The system of claim 8, wherein executing the task comprises running the task, reporting a result and terminating.

13. The system of claim 8, wherein the directed acyclic graph (DAG) feature analyzer includes a graph having vertices representing resilient distributed datasets, and edges representing operations applied to the resilient distributed datasets.

14. The system of claim 13, wherein the directed acyclic graph (DAG) feature analyzer includes two stages, wherein a first stage recommends executor resource allocation based on the resource data from the at least one executor pod, and a second stage captures Kubernetes resource observability to balance resource autoscaling responsive to the executor resource allocation based on the resource data.

15. A computer program product for controlling data locality in Kubernetes comprising a computer readable storage medium having computer readable program code embodied therewith program instructions executable by a processor to cause the processor to:

establish, using the processor, a Kubernetes computing environment including a controller and at least one executor pod for running an application;

receive, using the processor, a request for a task to be run in the Kubernetes computing environment;

dispatch, using the processor, a sidecar to collect resource data from the at least one executor pod for an input to a directed acyclic graph (DAG) feature analyzer that communicates with the at least one executor pod within worker nodes and a driver pod through the sidecar;

identify with a acyclic graph (DAG) feature analyzer from the at least one executor pod a best dynamic resource that are available to execute the task by generating a multi-level DAG based on collected resource data by the sidecar that includes a data persistence classification of operations executed by the application across partitions; and execute, using the processor, the task on at least one executor pod meeting the best dynamic resource that is available in the Kubernetes computing environment.

16. The computer program product of claim 15, wherein receiving the request for a task to be run comprises an application operator generating a task with a submission runner that sends the task to a master server that commissions a scheduler to communicate with a driver pod and worker nodes of the Kubernetes computing environment.

17. The computer program product of claim 16, wherein dispatching the sidecar comprises collecting the resource data using the driver pod and the worker nodes.

18. The computer program product of claim 15, wherein the resource data is selected from data volume statistics consisting of executor pod volume, data volume, node information, data output ranges, max value size, CPU usage, storage usage, and combinations thereof.

19. The computer program product of claim 15, wherein executing the task comprises running the task, reporting a result and terminating.

20. The computer program product of claim 15, wherein the directed acyclic graph (DAG) feature analyzer includes a graph having vertices representing resilient distributed datasets, and edges representing operations applied to the resilient distributed datasets.

* * * * *